(12) United States Patent
Madina et al.

(10) Patent No.: US 11,030,295 B2
(45) Date of Patent: Jun. 8, 2021

(54) ENABLING WEBGUI ACCESS TO TARGET SYSTEMS

(71) Applicant: SAP SE, Walldorf (DE)

(72) Inventors: Joshu Madina, Bangalore (IN); Appalaswamy Yalamanchily, Bangalore (IN); Wolfgang Janzen, Mannheim (DE); Ralf Scheurer, Wiesloch (DE); Badari Nath J, Bangalore (IN); Sarma Adithe, Palo Alto, CA (US)

(73) Assignee: SAP SE, Walldorf (DE)

( * ) Notice: Subject to any disclaimer, the term of this patent is extended or adjusted under 35 U.S.C. 154(b) by 305 days.

(21) Appl. No.: 16/226,826

(22) Filed: Dec. 20, 2018

(65) Prior Publication Data

US 2020/0201980 A1    Jun. 25, 2020

(51) Int. Cl.
| | |
|---|---|
| *G06F 21/41* | (2013.01) |
| *G06F 9/54* | (2006.01) |
| *G06F 21/62* | (2013.01) |
| *H04L 29/08* | (2006.01) |
| *G06F 16/955* | (2019.01) |

(52) U.S. Cl.
CPC ............. *G06F 21/41* (2013.01); *G06F 9/547* (2013.01); *G06F 16/955* (2019.01); *G06F 21/629* (2013.01); *H04L 67/02* (2013.01)

(58) Field of Classification Search
CPC ........ G06F 21/629; G06F 21/41; G06F 9/547; G06F 16/955; H04L 67/02
USPC .......................................................... 726/8
See application file for complete search history.

(56) References Cited

U.S. PATENT DOCUMENTS

| | | | |
|---|---|---|---|
| 8,607,306 B1* | 12/2013 | Bridge ................. H04L 63/08 726/1 |
| 2002/0007317 A1* | 1/2002 | Callaghan .......... G06Q 30/0633 705/26.8 |
| 2005/0283455 A1* | 12/2005 | Kemmer ................ H04L 67/38 |
| 2006/0041933 A1* | 2/2006 | Yakov ................ H04L 63/0815 726/8 |
| 2009/0193129 A1* | 7/2009 | Agarwal ............... H04L 67/28 709/229 |
| 2010/0083078 A1* | 4/2010 | Asai ....................... H04L 67/28 715/208 |
| 2012/0136926 A1* | 5/2012 | Dillon ................ G06F 16/9574 709/203 |
| 2014/0164447 A1* | 6/2014 | Tarafdar ............... G06F 16/182 707/827 |
| 2017/0324749 A1* | 11/2017 | Bhargava .............. H04L 63/108 |

(Continued)

OTHER PUBLICATIONS

NPL Search Terms (Year: 202).*
NPL Search Terms (Year: 2021).*

*Primary Examiner* — Syed A Zaidi
(74) *Attorney, Agent, or Firm* — Fish & Richardson P.C.

(57) ABSTRACT

Methods, systems, and computer-readable storage media for receiving, by an intermediate system from a web browser, a request to access a target system, in response to the request, transmitting, by the intermediate system, a request for a reentrance ticket to a target system, the request for a reentrance ticket including user credentials, and transmitting, by the intermediate system, the reentrance ticket to the web browser, the web browser transmitting a request for a security session to the target system, and executing one or more calls to the target system during the security session.

20 Claims, 6 Drawing Sheets

(56) References Cited

U.S. PATENT DOCUMENTS

2018/0026964 A1* 1/2018 Child .................... H04L 63/062
                                                  726/8
2018/0144117 A1   5/2018 Engler et al.

* cited by examiner

ENABLING WEBGUI ACCESS TO TARGET SYSTEMS

BACKGROUND

Vendors can provide software systems for enterprises. In some instances, a software system can be provided to an enterprise as an on-premise system, which is executed on a system operated by, or on behalf of the enterprise. Vendors can also provide vendor-hosted systems that provide access control to an on-premise system, which, in this context, can be referred to as a target system. For example, access control can be used to establish remote access to the on-premise system (target system) through the vendor-hosted system. In traditional approaches, this is achieved through vendor-specific graphical user interfaces (GUIs), and access is provided to the on-premise system through a security session with the vendor-hosted system. However, as technology has evolved, there is a need to provide users with direct, remote access in security session through web-based GUIs.

SUMMARY

Implementations of the present disclosure are directed to remotely accessing security sessions with target systems. More particularly, implementations of the present disclosure are directed to web-based graphical user interface (GUI) access to security sessions with target systems through access control of an intermediate system.

In some implementations, actions include receiving, by an intermediate system from a web browser, a request to access a target system, in response to the request, transmitting, by the intermediate system, a request for a reentrance ticket to a target system, the request for a reentrance ticket including user credentials, and transmitting, by the intermediate system, the reentrance ticket to the web browser, the web browser transmitting a request for a security session to the target system, and executing one or more calls to the target system during the security session. Other implementations of this aspect include corresponding systems, apparatus, and computer programs, configured to perform the actions of the methods, encoded on computer storage devices.

These and other implementations can each optionally include one or more of the following features: the request for the reentrance ticket is transmitted from the target system to the intermediate system over a remote function call (RFC) channel; the reentrance ticket is transmitted to the web browser and includes an auto-submit function that is automatically executed by the web browser to transmit the request for the security session to the target system; the reentrance ticket, a uniform resource locator (URL) of a single-sign on (SSO) control endpoint, and a URL of a web-based application of the target system are transmitted to the web browser in a form from the intermediate system; the intermediate system is hosted by a vendor, and the target system is provided by the vendor, and hosted by an enterprise as an on-premise system; the credentials are assigned to a firefighter user; and actions further include providing a hypertext transfer protocol (HTTP) session between the web browser and the intermediate system, the request to access the target system being transmitted over the HTTP session.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are directed to remotely accessing security sessions with target systems. More particularly, implementations of the present disclosure are directed to web-based graphical user interface (GUI) access to security sessions with target systems through access control of an intermediate system. Implementations can include actions of receiving, by an intermediate system from a web browser, a request to access a target system, in response to the request, transmitting, by the intermediate system, a request for a reentrance ticket to a target system, the request for a reentrance ticket including user credentials, and transmitting, by the intermediate system, the reentrance ticket to the web browser, the web browser transmitting a request for a security session to the target system, and executing one or more calls to the target system during the security session.

Figure 1:
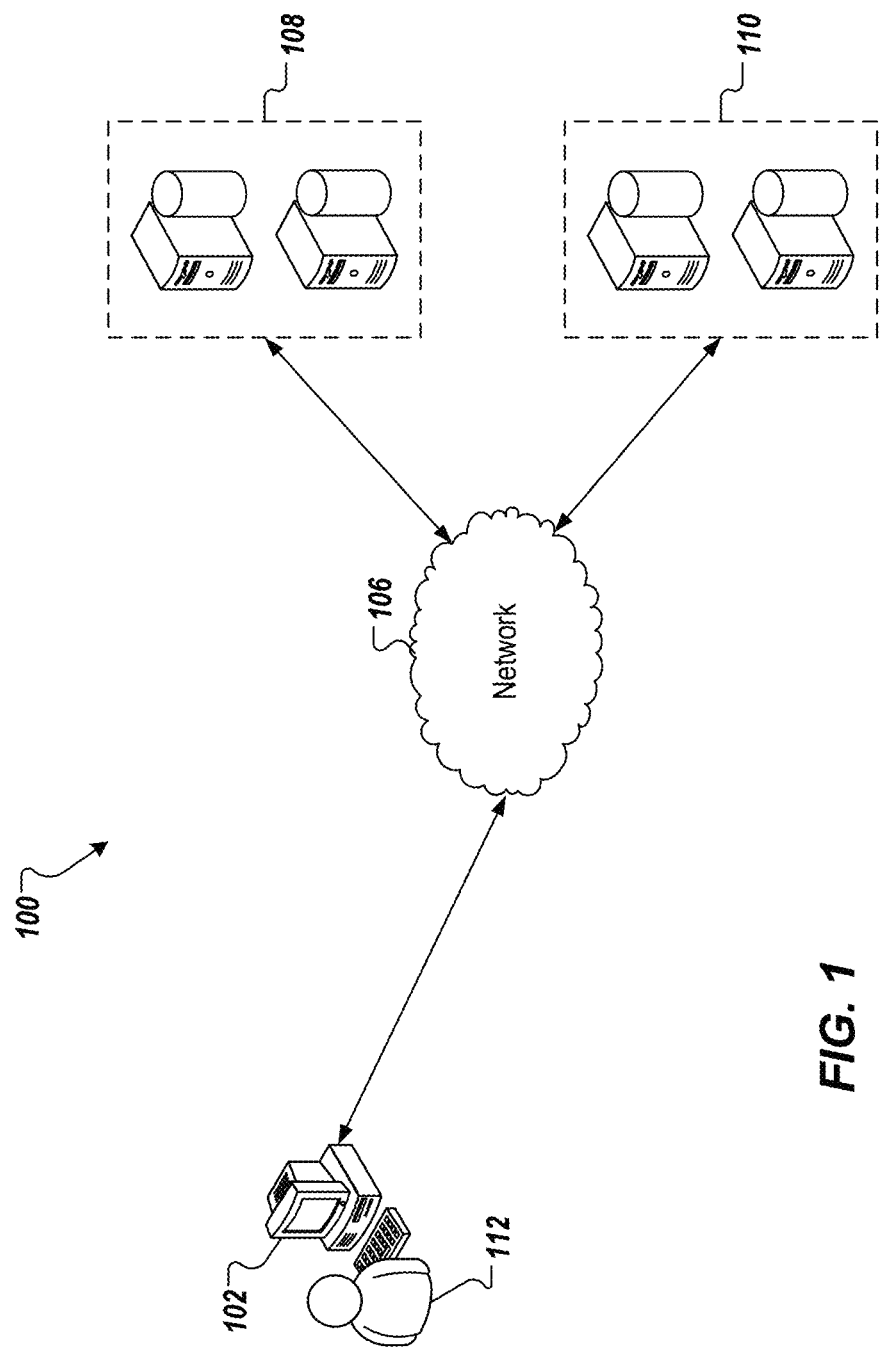
FIG. 1 depicts an example architecture that can be used to execute implementations of the present disclosure.

FIG. 1 depicts an example architecture 100 in accordance with implementations of the present disclosure. In the depicted example, the example architecture 100 includes a client device 102, a network 106, and server systems 108, 110. Each of the server systems 108, 110 includes one or more server devices and databases (e.g., processors, memory). In the depicted example, a user 112 interacts with the client device 102. In an example context, the user 112 can interact with applications hosted on the server system 108, and/or the server system 110 through the client device 102.

In some examples, the client device 102 can communicate with the server systems 108, 110 over the network 106. In some examples, the client device 102 can include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, each of the server systems 108, 110 includes at least one server and at least one data store. In the example of FIG. 1, the server systems 108, 110 are intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, the server system 108 can host a vendor-hosted software system hosted on a platform of a vendor, and the server system 110 can host a software system hosted on a platform of an enterprise. In some implementations, the vendor-hosted software system of the server system 108 provides functionality to manage the software system of the server system 110. In some examples, and as described in further detail herein, the vendor-hosted software system of the server system 108 provides access control for remote access to the software system of the server system 110 through security sessions.

Implementations of the present disclosure are described in further detail herein with reference to an example software system. An example vendor-hosted software system includes SAP Governance, Risk and Compliance (GRC) system provided by SAP SE of Waldorf, Germany. For example, SAP GRC can be executed on the server system 108 of FIG. 1. SAP GRC includes an access control system, referred to as SAP GRC Access Control, which manages and validates user access, automates user provisioning, and supports certifying access to target systems. An example software system includes SAP Enterprise Resource Planning (ERP) provided by SAP SE. For example, SAP ERP can be executed on the server system 108 as an on-premise solution. In this context, SAP ERP can be referred to as a target system that is accessed using security sessions established by SAP GRC.

It is contemplated, however, that implementations of the present disclosure are applicable to any appropriate target system, and software system that implements access control for target systems.

To provide further context for implementations of the present disclosure, SAP GRC Access Control enables users to remotely, and seamlessly access privileged sessions using remote function call (RFC) sessions. This occurs without user intervention for the user credentials for the remote sessions. For SAP GRC, this is enabled through Trusted RFC, or regenerating credentials (e.g., passwords) during runtime.

Figure 2:
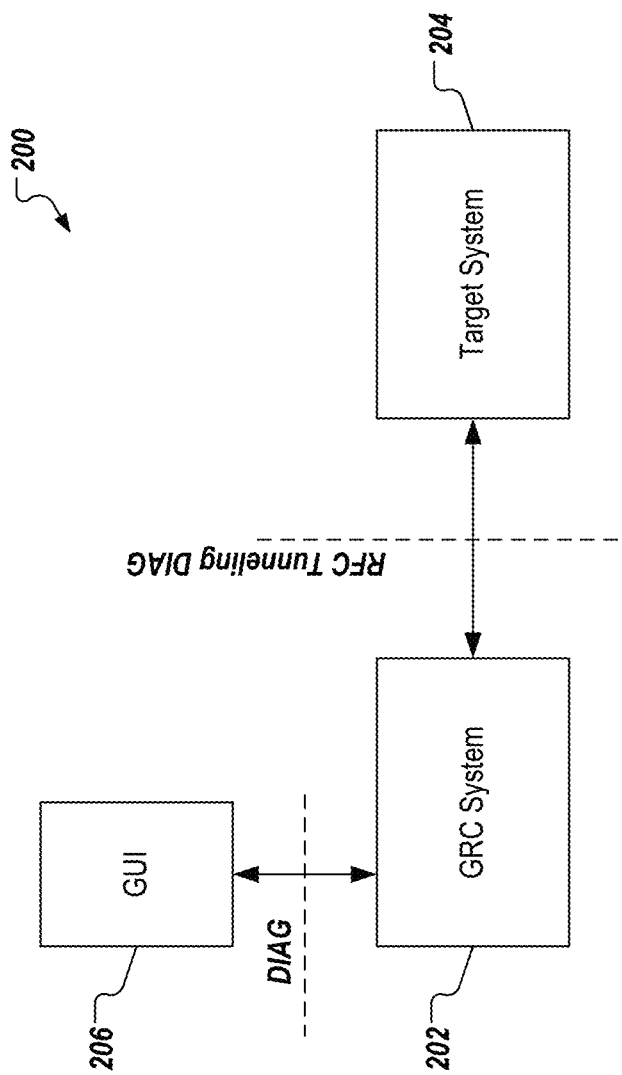
FIG. 2 depicts an example conceptual architecture in accordance with traditional systems.

FIG. 2 depicts an example conceptual architecture 200 in accordance with traditional systems. The example conceptual architecture 200 includes a GRC system 202, and a target system 204. In some examples, the GRC system 202 includes an application server that hosts a suite of GRC solutions. Example GRC solutions include, without limitation, access control (AC), process control (PC), risk management (RM), and component lifecycle management (CLM). In some examples, the target system 204 includes an on-premise system of an enterprise that is managed by the GRC system 202. For example, the target system 204 can include an ERP system (e.g., SAP ERP) that is managed by the GRC system 202.

A user interacts with the GRC system 202 through a graphical user interface (GUI), provided as a SAPGUI 206. The SAPGUI 206 can be described as the GUI client in a multi-tier architecture that includes a database, an application server, and a client. In some examples, the SAPGUI 206 enables the user access to functionality in hosted applications, and is used for remote access to the internal resources (e.g., SAP-internal resources). In some examples, interaction with the target system 204 is provided through the GRC system 202. More particularly, the user can interact with the target system 204 through the SAPGUI 206, and the GRC system 202.

In some examples, the SAPGUI 206 establishes a session (e.g., using a proprietary protocol (DIAG)) with the GRC system 202. The GRC system 202 communicates with the target system 204 through RFCs. In general, a RFC enables applications to communicate and exchange information with other systems. In the example of FIG. 2, the RFC is configured as a trusted connection between the GRC system 202, and the target system 204, and enables the user to access the target system 204 through the SAPGUI 206.

In some examples, the user can include a so-called firefighter, who needs to perform tasks in emergency, or otherwise extraordinary circumstances. The user is assigned a firefighter ID (FFID), which is a temporary user ID that grants the user exception-based, yet regulated, access to the target system 204. The firefighter ID is created by a system administrator through a respective SAPGUI 206. Accordingly, assignment of FFIDs, and enabling user remote access through a security session with elevated privileges.

As technology has evolved, and applications are moving to browser-based user interfaces (UIs), there is a need and a challenge to launch the remote, security session with elevated privileges for emergency activity without passing credentials in the web browser. This will enable the users to access web-based applications (e.g., Fiori Applications, WebDynPro Applications, CRMUI, SAP WEBUI). In some examples, the term WebGUI refers to a service of the GRC system that is run by the web browser. For example, the WebGUI can run on the GRC system 202, and/or the target system 204 to provide HTML-based UI emulation.

In view of the above context, implementations of the present disclosure enable users (e.g., firefighter users) access to target application in a security session from a web browser without credentials. In this manner, the users can have remote access to web-based applications through the security session. As described in further detail herein, implementations of the present disclosure leverage the concept of reentrance tickets and security sessions to seamlessly provide for remote login to a security session. This is achieved without disrupting the existing standard functionality. In some examples, a reentrance ticket is a security token that allows the holder to re-enter the system, typically by other protocols (e.g., RFC→HTTP) without providing (other) credentials. Typically, this re-entering has to be completed in a relatively short period of time after provision of the security token. In some examples, a security session preserves the security state, which results from a successful authentication (e.g. using a valid re-entrance ticket). A security session is terminated when processing a logoff request (submitted by the user), or when requested by the system after a configurable period of inactivity (e.g., predefined period with absence of HTTP communication.

Figure 3:
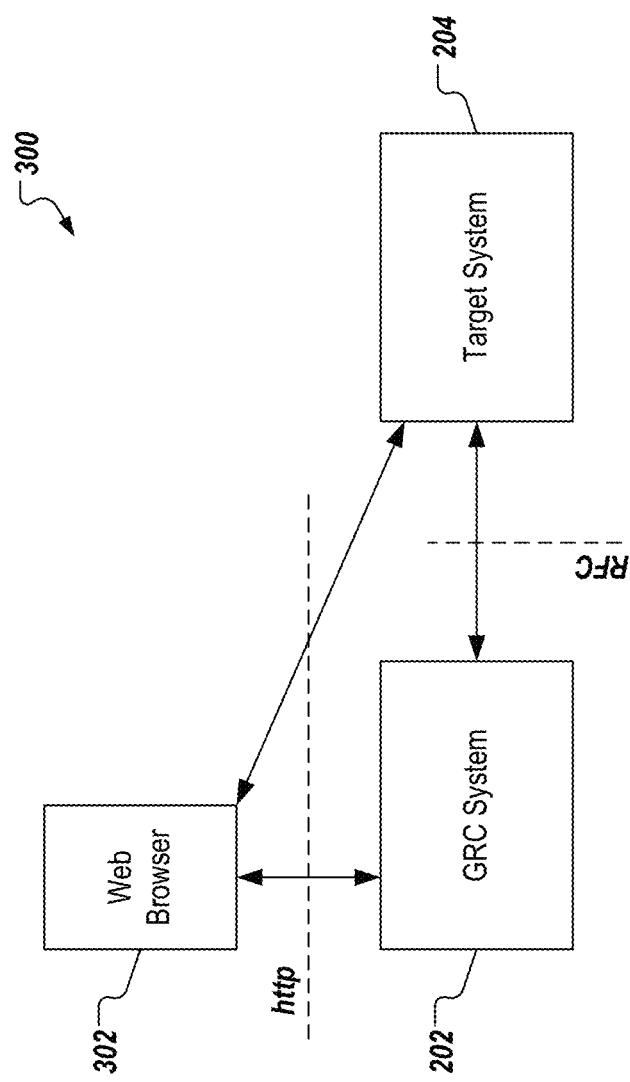
FIG. 3 depicts an example conceptual architecture in accordance with implementations of the present disclosure.

FIG. 3 depicts an example conceptual architecture 300 in accordance with implementations of the present disclosure. The example conceptual architecture 300 includes the GRC system 202, the target system 204, and a web browser 302. In accordance with implementations of the present disclosure, the GRC system 202 uses the credentials of a user (e.g., a firefighter user (FFID)) to call the target system 204 through RFC. In some implementations, the RFC creates a reentrance ticket. Before creating reentrance tickets, it is determined whether the target system 204 is configured for supporting security sessions. If the target system 204 is configured to support security sessions, the reentrance tickets will be generated. In some implementations, a function module determines the uniform resource locator (URL) for the SSO control endpoint (e.g., /sap/public/myssocntl) upon checking whether the requested service is active in the target system 204. In some implementations, after the reentrance ticket and the URL are generated, a security session is requested from the GRC system 202 to the target system 204 using a security sessions method. With this, the web applications will be launched successfully for the target system 204, and be accessible through the web browser 302.

Figure 4:
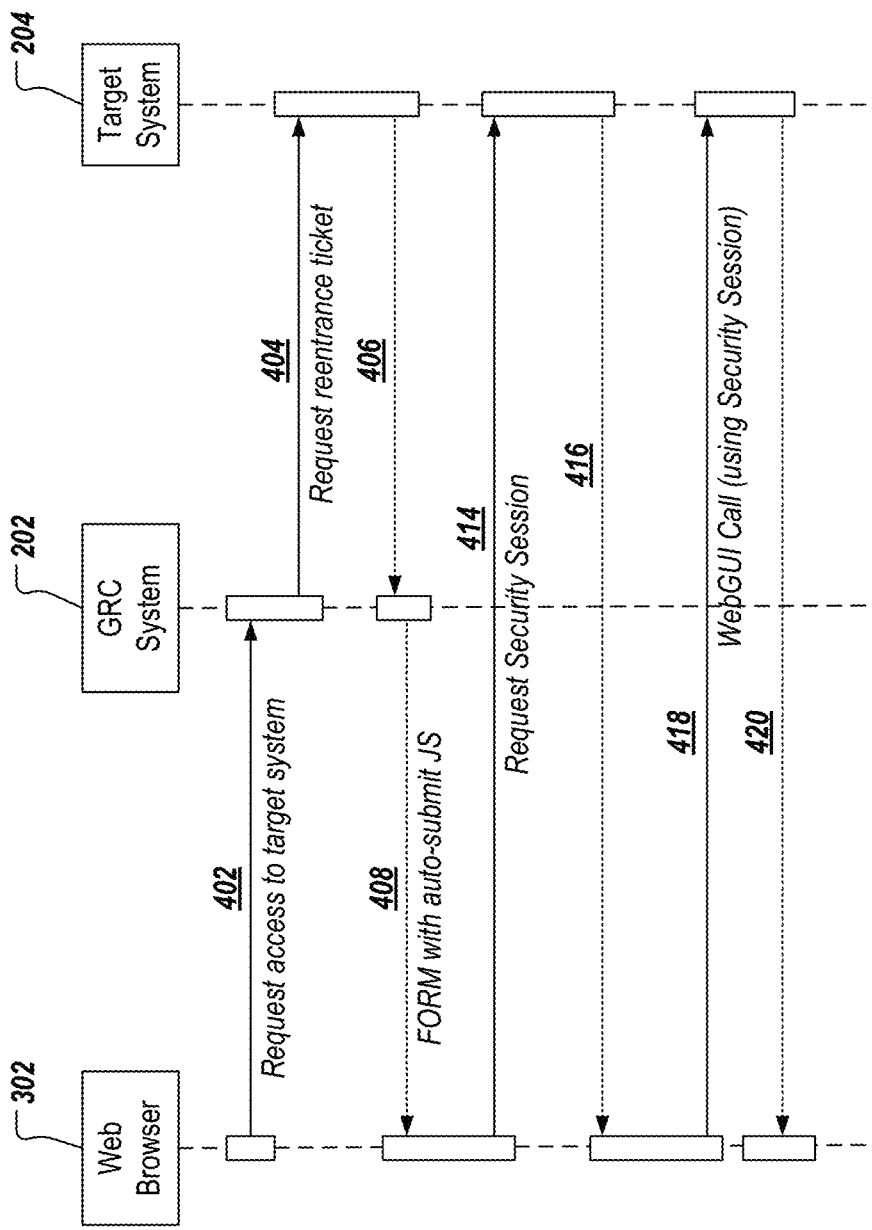
FIG. 4 depicts an example signal flow diagram in accordance with implementations of the present disclosure.

FIG. 4 depicts an example signal flow diagram 400 in accordance with implementations of the present disclosure. The example flow diagram 400 includes the web browser 302, the GRC system 202, and the target system 204. A request to access the target system is sent (402) to the WebGUI service of the GRC system 202 from the web browser 302. The GRC system 202 provides credentials (e.g., of the firefighter user (FFID)) through an RFC call to the target system 204, requesting (404) a reentrance ticket. The target system 204 receives the request, and returns (406) the reentrance ticket, the URL to the SSO control endpoint, and the URL of the web-based application to be called (target URL) to the GRC system 202. A new GUI control method can be called using the reentrance ticket. The GRC system 202 returns (408) a form (e.g., FORM with auto-submit Javascript (JS)) with the reentrance ticket and the target URL as hidden input fields to the web browser 302.

As this form is submitted automatically by JS, the web browser 302 sends (414) a post request for a security session to the SSO control endpoint of the target system 204, providing the reentrance ticket and the URL of the web-based application to be called. The target system 204 creates a security session after successful validation of the reentrance ticket, and instructs (416) the web browser 302 to perform a HTTP redirect. In response, the web browser 302 performs (418) a WebGUI call using the security session to the web-based application to be run under the user account (e.g., the firefighter user (FFID) account), and receives (420) responses from the target system 204.

Figure 5:
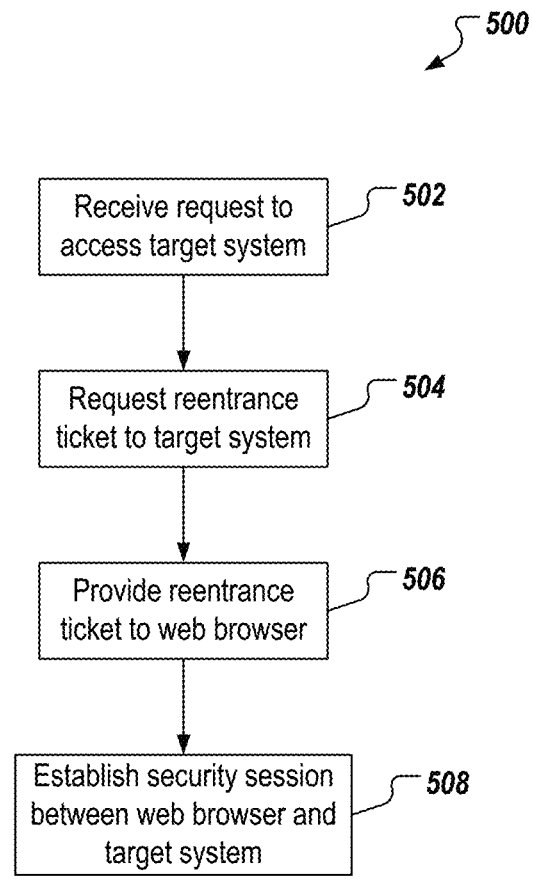
FIG. 5 depicts an example process that can be executed in accordance with implementations of the present disclosure.

FIG. 5 depicts an example process 500 that can be executed in accordance with implementations of the present disclosure. In some examples, the example process 500 is provided using one or more computer-executable programs executed by one or more computing devices.

A request to access a target system is received (502). For example, and as described herein, an intermediate system (e.g., a GRC system) receives a request for access to a target system from a web browser. In some examples, the web browser communicates with the intermediate system during an HTTP session, and issues the request using a WebGUI service. A reentrance ticket to the target system is requested (504). For example, the intermediate system provides credentials to the target system requesting a reentrance ticket. In some examples, the credentials are associated with a firefighter user. In some examples, the request is transmitted to the target system through RFC.

The reentrance ticket is provided to the web browser (506). For example, and as described herein, the target system the target system receives the request, and returns the reentrance ticket, the URL to the SSO control endpoint, and the URL of the web-based application to be called (target URL) to the intermediate system. A security session is established between the web browser and the target system (508). For example, the intermediate system returns a FORM with auto-submit Javascript (JS) that includes the reentrance ticket and the target URL as hidden input fields to the web browser. The web browser uses the information and transmits a request for a security session to the target system. Once the security system is established, the web browser submits calls to, and receives responses from the target system (e.g., the web application hosted on the target system).

Implementations of the present disclosure provide technical advantages over the traditional approach. For example, implementations of the present disclosure enables users to have access privileged sessions from web browser, and the users can have the access to the web-based applications. As another example, there is no disruption of the existing functionality, which means that remote access to privileged sessions from other channels is still possible.

Figure 6:
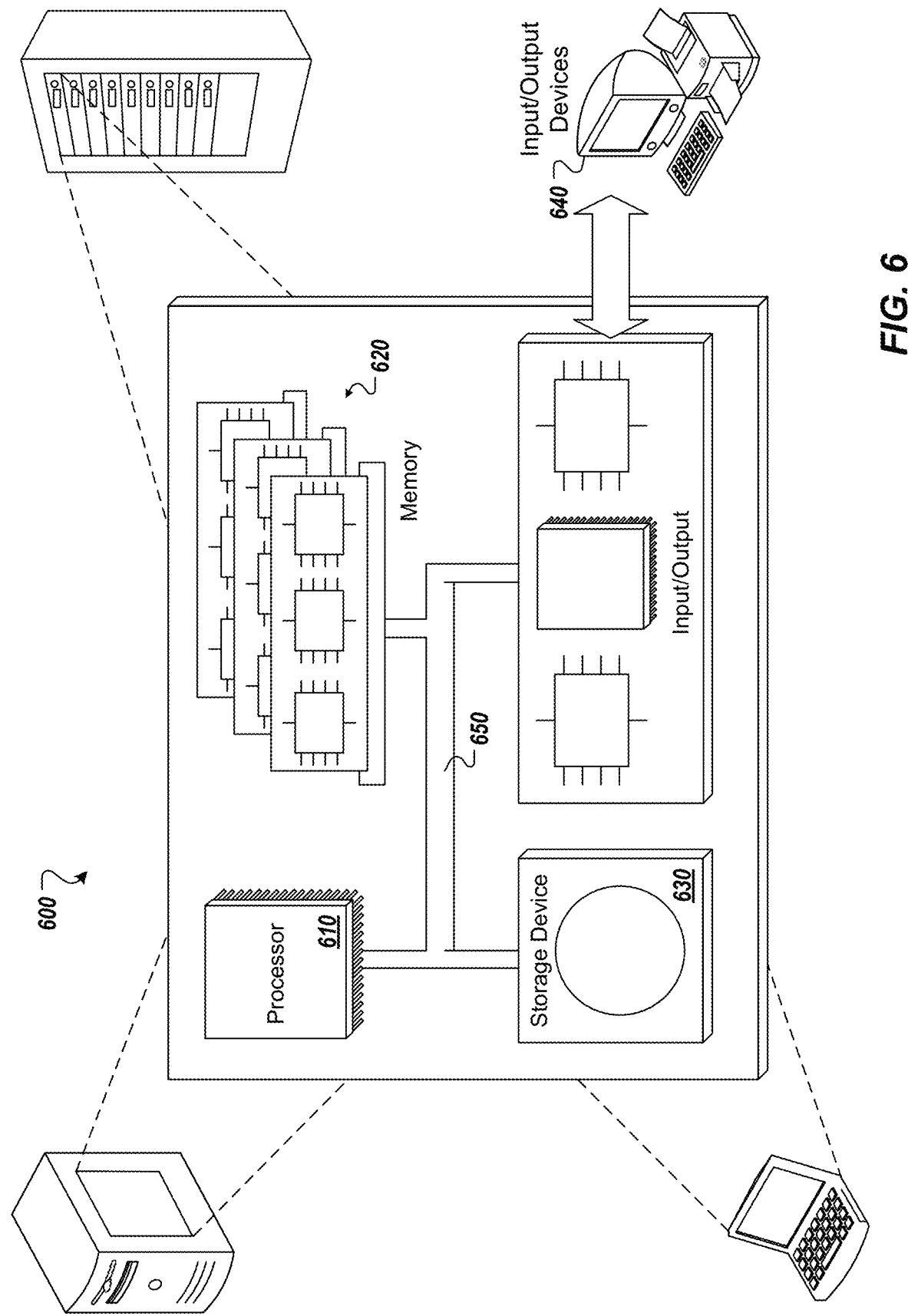
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. The components 610, 620, 630, 640 are interconnected using a system bus 650. The processor 610 is capable of processing instructions for execution within the system 600. In some implementations, the processor 610 is a single-threaded processor. In some implementations, the processor 610 is a multi-threaded processor. The processor 610 is capable of processing instructions stored in the memory 620 or on the storage device 630 to display graphical information for a user interface on the input/output device 640.

The memory 620 stores information within the system 600. In some implementations, the memory 620 is a computer-readable medium. In some implementations, the memory 620 is a volatile memory unit. In some implementations, the memory 620 is a non-volatile memory unit. The storage device 630 is capable of providing mass storage for the system 600. In some implementations, the storage device 630 is a computer-readable medium. In some implementations, the storage device 630 may be a floppy disk device, a hard disk device, an optical disk device, or a tape device. The input/output device 640 provides input/output operations for the system 600. In some implementations, the input/output device 640 includes a keyboard and/or pointing device. In some implementations, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for web-based graphical user interface (GUI) access to security sessions with target systems through access control of an intermediate system, the method being executed by one or more processors and comprising:
   receiving, by an intermediate system from a web browser, a request to access a web-based application executed within a target system;
   in response to the request, transmitting, by the intermediate system, a request for a reentrance ticket to access the web-based application executed within the target system, the request for a reentrance ticket comprising user credentials;
   receiving, by the intermediate system from the target system, the reentrance ticket and a uniform resource locator (URL) of the web-based application executed within the target system; and
   transmitting, by the intermediate system, the reentrance ticket and the URL of the web-based application to the web browser, the web browser transmitting a request for a security session to the web-based application using the URL, and executing one or more calls directly with the web-based application executed within the target system during the security session, the request for a security session being absent user credentials.

2. The method of claim 1, wherein the request for the reentrance ticket is transmitted from the target system to the intermediate system over a remote function call (RFC) channel.

3. The method of claim 1, wherein the reentrance ticket is transmitted to the web browser and includes an auto-submit function that is automatically executed by the web browser to transmit the request for the security session to the target system.

4. The method of claim 1, wherein the reentrance ticket, a uniform resource locator (URL) of a single-sign on (SSO) control endpoint, and the URL of the web-based application of the target system are transmitted to the web browser in a form from the intermediate system.

5. The method of claim 1, wherein the intermediate system is hosted by a vendor, and the target system is provided by the vendor, and hosted by an enterprise as an on-premise system.

6. The method of claim 1, wherein the credentials are assigned to a firefighter user.

7. The method of claim 1, further comprising providing a hypertext transfer protocol (HTTP) session between the web browser and the intermediate system, the request to access the target system being transmitted over the HTTP session.

8. A non-transitory computer-readable storage medium coupled to one or more processors and having instructions stored thereon which, when executed by the one or more processors, cause the one or more processors to perform operations for web-based graphical user interface (GUI) access to security sessions with target systems through access control of an intermediate system, the operations comprising:
- receiving, by an intermediate system from a web browser, a request to access a web-based application executed within a target system;
- in response to the request, transmitting, by the intermediate system, a request for a reentrance ticket to access the web-based application executed within the target system, the request for a reentrance ticket comprising user credentials;
- receiving, by the intermediate system from the target system, the reentrance ticket and a uniform resource locator (URL) of the web-based application executed within the target system; and
- transmitting, by the intermediate system, the reentrance ticket and the URL of the web-based application to the web browser, the web browser transmitting a request for a security session to the web-based application using the URL, and executing one or more calls directly with the web-based application executed within the target system during the security session, the request for a security session being absent user credentials.

9. The computer-readable storage medium of claim 8, wherein the request for the reentrance ticket is transmitted from the target system to the intermediate system over a remote function call (RFC) channel.

10. The computer-readable storage medium of claim 8, wherein the reentrance ticket is transmitted to the web browser and includes an auto-submit function that is automatically executed by the web browser to transmit the request for the security session to the target system.

11. The computer-readable storage medium of claim 8, wherein the reentrance ticket, a uniform resource locator (URL) of a single-sign on (SSO) control endpoint, and the URL of the web-based application of the target system are transmitted to the web browser in a form from the intermediate system.

12. The computer-readable storage medium of claim 8, wherein the intermediate system is hosted by a vendor, and the target system is provided by the vendor, and hosted by an enterprise as an on-premise system.

13. The computer-readable storage medium of claim 8, wherein the credentials are assigned to a firefighter user.

14. The computer-readable storage medium of claim 8, wherein operations further comprise providing a hypertext transfer protocol (HTTP) session between the web browser and the intermediate system, the request to access the target system being transmitted over the HTTP session.

15. A system, comprising:
- a computing device; and
- a computer-readable storage device coupled to the computing device and having instructions stored thereon which, when executed by the computing device, cause the computing device to perform operations for web-based graphical user interface (GUI) access to security sessions with target systems through access control of an intermediate system, the operations comprising:
  - receiving, by an intermediate system from a web browser, a request to access a web-based application executed within a target system;
  - in response to the request, transmitting, by the intermediate system, a request for a reentrance ticket to access the web-based application executed within the target system, the request for a reentrance ticket comprising user credentials;
  - receiving, by the intermediate system from the target system, the reentrance ticket and a uniform resource locator (URL) of the web-based application executed within the target system; and
  - transmitting, by the intermediate system, the reentrance ticket and the URL of the web-based application to the web browser, the web browser transmitting a request for a security session to the web-based application using the URL, and executing one or more calls directly with the web-based application executed within the target system during the security session, the request for a security session being absent user credentials.

16. The system of claim 15, wherein the request for the reentrance ticket is transmitted from the target system to the intermediate system over a remote function call (RFC) channel.

17. The system of claim 15, wherein the reentrance ticket is transmitted to the web browser and includes an auto-submit function that is automatically executed by the web browser to transmit the request for the security session to the target system.

18. The system of claim 15, wherein the reentrance ticket, a uniform resource locator (URL) of a single-sign on (SSO) control endpoint, and the URL of the web-based application of the target system are transmitted to the web browser in a form from the intermediate system.

19. The system of claim 15, wherein the intermediate system is hosted by a vendor, and the target system is provided by the vendor, and hosted by an enterprise as an on-premise system.

20. The system of claim 15, wherein the credentials are assigned to a firefighter user.

* * * * *